No. 783,667. PATENTED FEB. 28, 1905.
J. A. BARCLAY.
HYDROSTATICAL WEIGHING SCALE.
APPLICATION FILED JAN. 26, 1904.
2 SHEETS—SHEET 1.
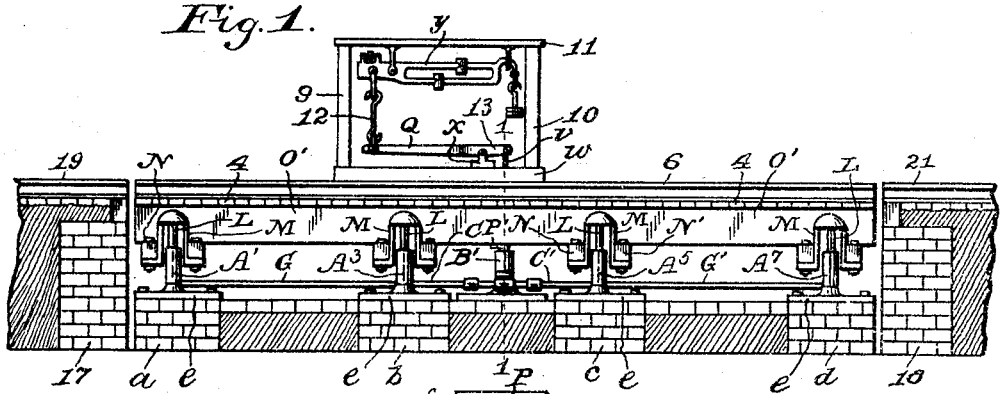
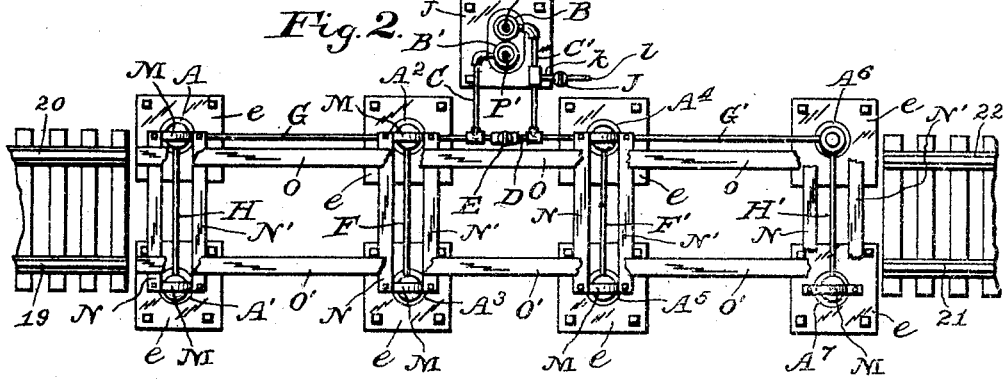
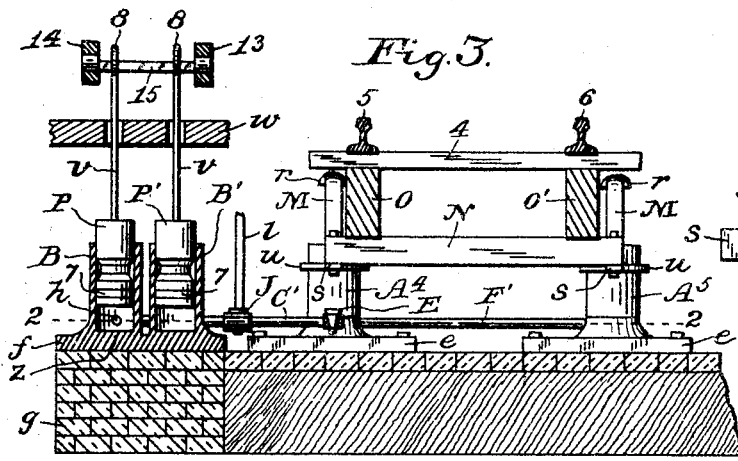
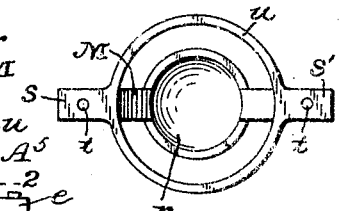
Witnesses:
Dow W. Voorhies.
Stella Snider.
Inventor:
Jas. A. Barclay,
By E. T. Silvius,
Attorney.

No. 783,667. PATENTED FEB. 28, 1905.
J. A. BARCLAY.
HYDROSTATICAL WEIGHING SCALE.
APPLICATION FILED JAN. 26, 1904.
2 SHEETS—SHEET 2.
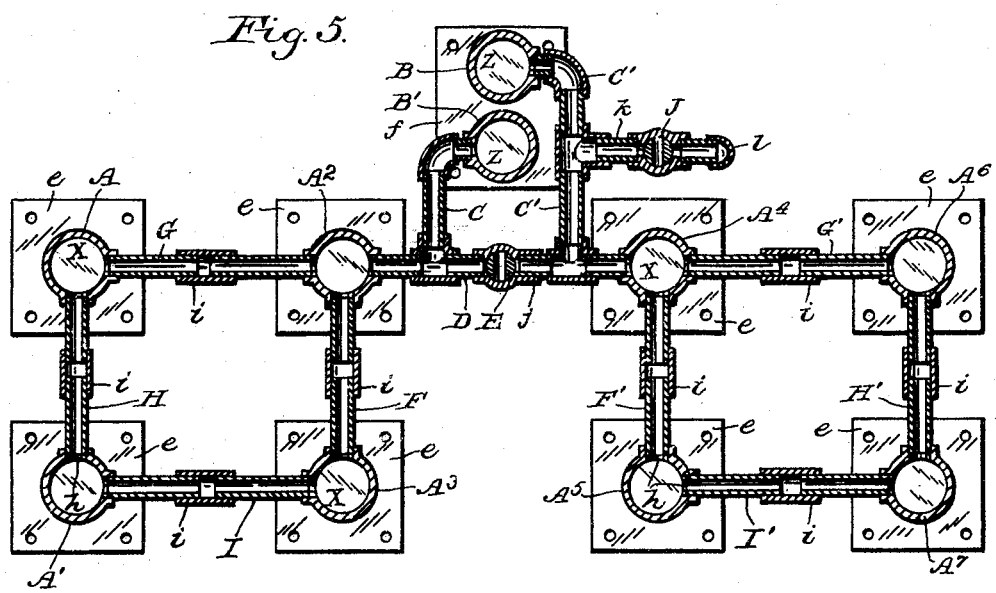
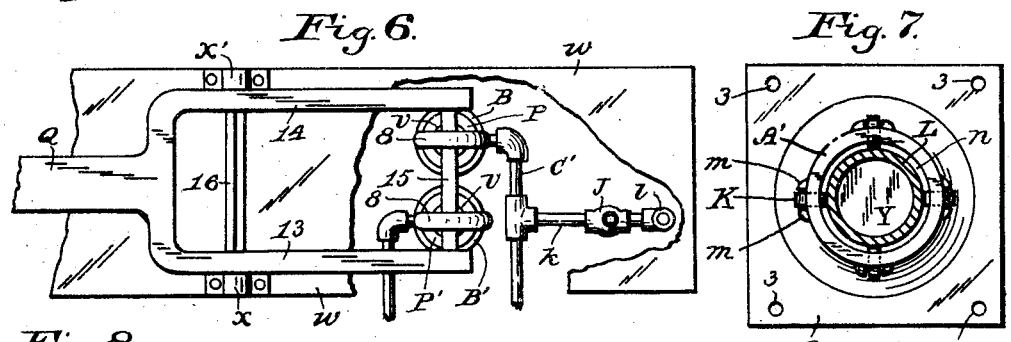
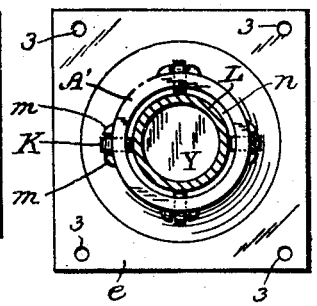
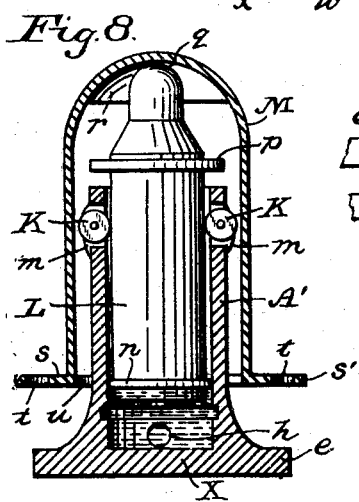
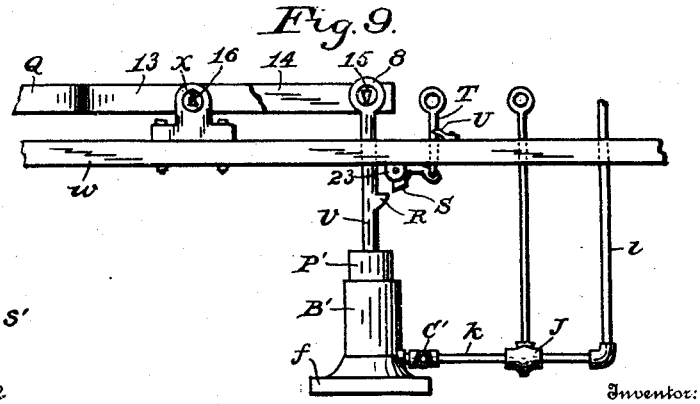
Witnesses:
Don W. Voorhies.
Stella Snider.
Inventor:
Jas. A. Barclay,
By E. T. Silvius,
Attorney.

No. 783,667.

Patented February 28, 1905.

UNITED STATES PATENT OFFICE.

JAMES A. BARCLAY, OF INDIANAPOLIS, INDIANA.

HYDROSTATICAL WEIGHING-SCALE.

SPECIFICATION forming part of Letters Patent No. 783,667, dated February 28, 1905.

Application filed January 26, 1904. Serial No. 190,665.

*To all whom it may concern:*

Be it known that I, JAMES A. BARCLAY, a citizen of the United States, residing at Indianapolis, in the county of Marion and State of Indiana, have invented new and useful Improvements in Hydrostatical Weighing-Scales; and I do declare the following to be a full, clear, and exact description of the invention, reference being had to the accompanying drawings, and to the letters and figures of reference marked thereon, which form a part of this specification.

This invention relates to weighing-scales that are designed to be erected either in pits or in more elevated positions for weighing loads on vehicles, such as wagons and railway-cars, or for weighing grain and other substances in hoppers which may be mounted on the scales, the invention having reference particularly to the means whereby the values of the loads with respect to the weights thereof may be indicated.

Objects of the invention are to provide weighing-scales adapted to be constructed cheaply and to be operated economically and reliably and which may be erected on foundations that may be cheaply provided.

The invention consists in weighing-scales comprising vessels connected together by ducts and adapted to contain liquid substance, means for confining the liquid substance in the vessels and the ducts collectively, a platform or load-holder supported by means of liquid substance in the vessels and ducts, and means operatively connected with the liquid substance for indicating the weights that may be put upon the platform or holder and transmitted through the medium of the liquid substance; and the invention consists, further, in the novel parts and in the combinations and arrangements of parts, as hereinafter particularly described and claimed.

Referring to the drawings, Figure 1 is a side elevation of the scales, illustrated as when designed to be employed as railway-track scales; Fig. 2, a fragmentary top plan of the scales with the flooring of the platform removed, showing the general arrangement of the principal parts; Fig. 3, a fragmentary transverse sectional view as on the line 1 1 in Fig. 1, showing principal parts of the apparatus, on an enlarged scale; Fig. 4, an inverted plan view of one of the stirrups for supporting the platform on the pistons that operate on the liquid in the vessels; Fig. 5, a horizontal sectional view as on a line 2 2 in Fig. 3, showing the arrangement of the vessels and the connecting-ducts thereof; Fig. 6, a fragmentary top plan view showing a shelf-lever and the connections therefor with the pistons that are acted on by the liquid substance; Fig. 7, a horizontal sectional view taken at the top of one of the vessels, only the piston thereof being shown in section; Fig. 8, a vertical central sectional view of one of the vessels and stirrups and a piston in elevation connected therewith, and Fig. 9 is a fragmentary detail view showing in side elevation the shelf-lever and connections and other features.

Similar reference characters in the several figures of the drawings designate corresponding parts or features.

For descriptive purposes the type of scales suited for railway-track scales is selected in illustrating the construction and purposes of the invention, and it will be obvious that the structure may be erected in any suitable place—in a pit, on the surface of the ground, or on a scaffold—and as a wagon-scale the rails on the platform will be dispensed with, while obviously a hopper may be mounted on the platform for weighing bulk substances.

In construction suitable foundations, as $a$ $b$ $c$ $d$, are provided, upon which are mounted a plurality of pairs of vessels of suitable form, the preferred form being that shown comprising upright hollow open-top main cylinders, as A A', $A^2 A^3$, $A^4 A^5$, $A^6 A^7$, at least two pairs of the cylinders being required in the smaller sizes of scales and four or more pairs being desirable in the larger sizes, arranged as shown, the two cylinders of each pair being somewhat separated, so that they be farther apart than the wheels on the axles of vehicles, and the pairs arranged parallel to one another. Each cylinder has a substantial base $e$, having bolt-holes 3 and forming the bottom X of the cylinder, which is designed to hold liquid under great pressure. Two other cylinders B and B', similar to the others, are attached to a base $f$ and mounted on a foundation $g$ near two of the main cylinders $A^2$ $A^4$. Each cylinder has one or more lateral openings $h$ in the lower portion thereof, to which pipes forming ducts are connected, so that communication may be had between all of the cylinders for the liquid to find its level throughout the system of cylinders and ducts. A number of main cylinders comprising a set thereof are connected directly to the cylinder B and an equal number to the cylinder B', and the two sets are connected together, but may be separated by a cut-out cock. Specifically, a pipe C connects the cylinder B' with a main cylinder $A^2$, and a pipe C' connects the cylinder B with a main cylinder $A^4$, and a branch pipe D, having a cut-out cock E, connects the pipes C and C'. A pipe F connects the cylinder $A^2$ with the cylinder $A^3$, forming a pair. A pipe F' connects the cylinder $A^4$ with the cylinder $A^5$, forming another pair. A pipe G connects the cylinder $A^2$ with the cylinder A, and a pipe G' connects the cylinder $A^4$ with the cylinder $A^6$. A pipe H connects the cylinder A with the cylinder A', forming a pair, and a pipe H' connects the cylinder $A^6$ with the cylinder $A^7$, forming another pair. A pipe I connects the cylinders A' and $A^3$, and a pipe I' connects the cylinders $A^5$ and $A^7$; but these pipes I and I' may in most cases be dispensed with. Each pipe has a suitable slip-joint $i$ when they extend directly between cylinders to permit expansion and contraction of the pipes. Also the pipe D has a slip-joint $j$ at an end of the cock E, or elsewhere, if preferred. A branch pipe $k$ is connected with one of the aforesaid pipes, as the pipe C', and is provided with a stop-cock J and also a filling-pipe $l$, to which a suitable pump may be connected for forcing liquid into the cylinders and ducts, which may be done when the cocks E and J are open. The cock E is usually closed when the scales are in use.

Each main cylinder, as A', is provided near the top thereof with a suitable number of rollers K, pivotally mounted in ears $m$ and extending through suitable apertures in the cylinder-wall. In each one of said cylinders is a piston L, bearing against said rollers and having suitable packing $n$ at the lower end thereof, the lower end of the piston having a head Y. The upper part of the piston is provided with a stop-collar $p$, adapted to engage the top of the cylinder when the piston is down to its designed limit of movement for supporting the piston and its load when necessary. Above the stop-collar the piston has a ball top $q$, on which rests a stirrup M, having a cup-socket $r$ directly engaging the top $q$. The stirrup extends down over opposite sides of the cylinder and has a pair of steps $s$ and $s'$, in which are bolt-holes $t$, the step ends of the stirrup being braced by an annular brace $u$, attached thereto and extending about the cylinder with which it operates. Each pair of stirrups M supports a pair of transverse beams N N', bolted to the steps, and a pair of longitudinal beams O O' are mounted on the transverse beams, a floor 4 being attached to the tops of the beams O O'. Track-rails 5 and 6 are laid on the floor when designed for weighing railway-cars and their loads.

In the cylinder B is a piston P, and in the cylinder B' is a piston P', each piston having suitable packing 7 at the lower end thereof and provided with a stem $v$, having an eye 8 at the top thereof, the stems extending upwardly through a suitable beam-box base $w$, having posts 9 and 10 and a cap-beam 11. Stands $x$ $x'$ are mounted on the base $w$ and support a shelf-lever Q. A scale-beam $y$ is supported by the beam 11 and is connected in the usual manner by a link 12 to the longer arm of the lever Q. The lever Q has a pair of shorter arms 13 and 14 at its opposite end from the link 12, and a bearing-pin 15 is attached to the shorter arms and extends through the two eyes 8 of the stems of the pistons P P'. A bearing-pin 16 is also attached to the arms 13 and 14 and is mounted in the stands $x$ $x'$. It will be noticed that the stems $v$ are designed to normally push upwardly against the pin 15, and the pin 16 will press upwardly, while the link will be drawn downwardly, the bottoms Z of the cylinders B B' acting as opposing abutments, said bottoms being parts of the base $f$.

At the ends of the scale structure are abutments 17 and 18 and earth, on which are suitably laid rails 19 and 20 and 21 and 22, the rails being in alinement with the rails on the scale-platform.

In order to provide that the rails on the scales may be used as "dead track," so that separate dead rails, which are expensive, need not be provided, one of the stems $v$ (or both, if desired) is provided with a stop R, that may be engaged by a latch S, pivoted to a bracket 23, attached to the base $w$, the latch having a handle T, adapted to be locked by a catch U, mounted on the base $w$.

In practical use the lower parts of the cylinders and the connecting-ducts are to be supplied with suitable liquid, preferably such as cannot be frozen at natural low degrees of temperature, and the cock J should then be closed. The cock E may remain open if the loads be placed centrally on the scales, but should be closed if the loads be put upon the scales by means of wagons or railway-cars, so that neither end of the platform can be depressed excessively by the vehicle as it rolls on and off of the platform. If desired, the latches S may be put into use while moving the load on the platform. Whether the load be disposed centrally on the scales or unequally on the ends thereof the liquid will be forced to fill all of the spaces in the ducts and in the cylinders beneath the pistons, the pressure on the liquid which is confined by the packed pistons being exerted against the pistons P P', which may rise slightly, and consequently move the shorter arms 13 and 14 of the lever Q, the movement being transmitted to the scale-beam $y$ and the weight indicated thereby in the usual manner by means of the usual balance-weights. It will be understood that other indicating devices may be employed in lieu of the scale-beam.

Having thus described the invention, what I claim as new is—

1. Hydrostatic weighing-scales including a plurality of pairs of main cylinders and a pair of indicating-cylinders, ducts connecting a pair of the main cylinders with one of the pair of indicating-cylinders, ducts connecting another pair of the main cylinders with the other one of the indicating-cylinders, pistons in the cylinders, a platform or load-holder mounted on the pistons that are in the main cylinders, and a pivoted lever connected with the pistons that are in the pair of indicating-cylinders.

2. Hydrostatic weighing-scales including a plurality of pairs of main cylinders and a pair of indicating-cylinders, ducts connecting a pair of the main cylinders with one of the pair of indicating-cylinders, ducts connecting another pair of the main cylinders with the other one of the indicating-cylinders, pistons in the cylinders, a platform or load-holder mounted on the pistons that are in the main cylinders, a pivoted lever connected with the pistons that are in the pair of indicating-cylinders, weight-indicating devices connected with the lever, and locking means for the pistons that are in the indicating-cylinders.

3. Hydrostatic weighing-scales including a plurality of pairs of main cylinders and a pair of indicating-cylinders connected by ducts, pistons in the cylinders, a cut-out cock in one of the ducts for dividing the main cylinders into two systems having each an indicating-cylinder connected therewith, a platform or load-holder mounted on the pistons that are in the main cylinders, a pivoted lever connected with the pistons that are in the pair of indicating-cylinders, and weight-indicating devices connected with the lever.

4. Hydrostatic weighing-scales including a plurality of pairs of main cylinders and a pair of indicating-cylinders connected by ducts, pistons in the cylinders in a plane above the ducts, a cut-out cock in one of the ducts for dividing the main cylinders into two systems having each an indicating-cylinder connected therewith, a filling-pipe connected with one of the ducts, a platform or load-holder supported by means of the pistons that are in the main cylinders, a pivoted lever connected with the pistons that are in the indicating-cylinders, and weight-indicating devices connected with the lever.

5. Hydrostatic weight-scales including a plurality of pairs of main cylinders and a pair of indicating-cylinders, pistons in the cylinders, pipe-ducts connecting the cylinders, stirrups mounted on the pistons that are in the main cylinders, a platform mounted on the stirrups, a pivoted scale-beam, and a pivoted scale-lever connected to the scale-beam and also to the pistons that are in the pair of indicating-cylinders.

6. Hydrostatic weighing-scales including a plurality of pairs of main cylinders, pistons in the main cylinders provided with projections adapted to support the pistons on the cylinders, a pair of indicating-cylinders, a pivoted scale-lever, a pair of pistons in the pair of indicating-cylinders and connected to the scale-lever, ducts connecting the cylinders, liquid in the cylinders and also in the ducts, weight-indicating devices connected with the scale-lever, and a cut-out cock for dividing the main cylinders into two sets of cylinders having each an indicating-cylinder connected therewith disconnected from the other set of cylinders.

7. Hydrostatic weighing-scales including a plurality of pairs of vertical main cylinders provided with guide-rollers at the upper portions thereof, pistons in the cylinders engaging the rollers, stirrups mounted on the pistons, a platform mounted on the stirrups, a pair of indicating-cylinders, pipe-ducts connecting the cylinders, pistons in the indicating-cylinders operatively coupled together, weight-indicating devices connected to the coupled pistons that are in the indicating-cylinders, and means for cutting off the duct connection between the pair of indicating-cylinders.

8. In weighing-scales, the combination of a plurality of pairs of main cylinders, a pair of indicating-cylinders, pistons in the cylinders, pipe-ducts connecting the cylinders, stirrups mounted on the pistons in the main cylinders, a platform mounted on the stirrups, rails mounted on the platform, a pivoted scale-beam, a pivoted scale-lever connected to the scale-beam and also to the pistons that are in the pair of indicating-cylinders, and locks for the pistons that are in the indicating-cylinders.

In testimony whereof I affix my signature in presence of two witnesses.

JAMES A. BARCLAY.

Witnesses:
WM. H. PAYNE,
E. T. SILVIUS.